(12) United States Patent
Gillen et al.

(10) Patent No.: US 10,878,369 B2
(45) Date of Patent: Dec. 29, 2020

(54) METHODS, APPARATUSES AND COMPUTER PROGRAM PRODUCTS FOR FACILITATING LABEL LESS RETURNS

(71) Applicant: United Parcel Service of America, Inc., Atlanta, GA (US)

(72) Inventors: Robert J. Gillen, Johns Creek, GA (US); Douglas S. Takeuchi, Bellevue, WA (US); Deborah H. Carpenter, Marietta, GA (US); David Kaga, Marietta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 989 days.

(21) Appl. No.: 14/490,205

(22) Filed: Sep. 18, 2014

(65) Prior Publication Data

US 2015/0088781 A1 Mar. 26, 2015

Related U.S. Application Data

(60) Provisional application No. 61/880,584, filed on Sep. 20, 2013.

(51) Int. Cl.
*G06Q 10/08* (2012.01)
(52) U.S. Cl.
CPC ....... *G06Q 10/0837* (2013.01); *G06Q 10/083* (2013.01)
(58) Field of Classification Search
CPC ........................ G06Q 10/0837; G06Q 10/083
USPC ....................................................... 705/340
See application file for complete search history.

(56) References Cited

U.S. PATENT DOCUMENTS

| 5,602,382 A | 2/1997 | Ulvr et al. |
| 5,903,864 A | 5/1999 | Gadbois et al. |

(Continued)

FOREIGN PATENT DOCUMENTS

WO　　WO 96/38800　　12/1996

OTHER PUBLICATIONS

Cybra Introduces Green Ship Solutions for Digital Retail and Direct to Consumer Shipments. Dec. 14, 2011. PR Newswire Association LLC. (Year: 2011).*

(Continued)

*Primary Examiner* — George Chen
*Assistant Examiner* — Hunter A Molnar
(74) *Attorney, Agent, or Firm* — Shook, Hardy & Bacon L.L.P.

(57) ABSTRACT

An apparatus is provided for facilitating label-less returns. The apparatus may include a memory and a processor(s) configured to receive a shipment identifier of an item(s) responsive to a device scanning a label or marking(s) on the item(s) delivered to a customer for a shipper. The processor is also configured to determine whether the customer is registered in a returns program and whether the item(s) qualifies for return based on analyzing the identifier. The processor is also configured to generate a return authorization number (RAN) or indicator for the item(s) and link the RAN/indicator to the identifier responsive to verifying that the customer is registered and that the item(s) qualifies for return. The processor is further configured to cause return delivery of the item(s) to the shipper using the label or the marking(s) on the item(s) responsive to verifying the RAN/indicator is linked to the identifier. Corresponding computer program products and methods are also provided.

25 Claims, 10 Drawing Sheets

(56) References Cited

U.S. PATENT DOCUMENTS

| | | | |
|---|---|---|---|
| 5,945,919 A | 8/1999 | Trask | |
| 6,055,520 A | 4/2000 | Heiden et al. | |
| 6,694,248 B2 | 2/2004 | Smith et al. | |
| 6,889,194 B1 | 5/2005 | Kadaba | |
| 6,937,992 B1 | 8/2005 | Benda et al. | |
| 6,970,855 B2 | 11/2005 | Das et al. | |
| 7,617,133 B1* | 11/2009 | Antony | G06Q 10/08 705/26.7 |
| 7,853,481 B1 | 12/2010 | Johnson | |
| 8,010,463 B2 | 8/2011 | Gillen | |
| 9,292,824 B1* | 3/2016 | Freeman | G06Q 10/0837 |
| 2002/0019777 A1* | 2/2002 | Schwab | G06Q 10/0837 705/26.41 |
| 2002/0032612 A1* | 3/2002 | Williams | G06Q 10/08 705/26.1 |
| 2002/0046056 A1* | 4/2002 | Demarco | G06Q 10/083 705/330 |
| 2002/0099567 A1 | 7/2002 | Joao | |
| 2002/0152093 A1* | 10/2002 | Chalmers | G06Q 10/08 705/26.1 |
| 2002/0152174 A1 | 10/2002 | Woods et al. | |
| 2002/0188561 A1* | 12/2002 | Schultz | G06Q 10/0837 705/40 |
| 2003/0093383 A1 | 5/2003 | Reich et al. | |
| 2004/0073449 A1 | 4/2004 | Yang | |
| 2004/0203909 A1 | 10/2004 | Koster | |
| 2004/0230542 A1 | 11/2004 | Obrea | |
| 2004/0236707 A1 | 11/2004 | Lingdell | |
| 2005/0049890 A1* | 3/2005 | Kan | G06Q 10/0837 705/408 |
| 2005/0251402 A1 | 11/2005 | Olsen et al. | |
| 2006/0149577 A1* | 7/2006 | Stashluk, Jr. | G06Q 10/0837 705/340 |
| 2007/0198569 A1* | 8/2007 | Johnston | G06Q 10/08 |
| 2008/0004995 A1* | 1/2008 | Klingenberg | G06Q 10/08 705/28 |
| 2013/0284800 A1 | 10/2013 | Gillen et al. | |
| 2014/0009605 A1* | 1/2014 | Lane | G06Q 50/28 348/143 |

OTHER PUBLICATIONS

Using capitalism to solve social problems. (Jun. 7, 2010). CEO Wire, Fox News Network, Inc. p. 6. Retrieved from https://dialog.proquest.corn/professional/docview/365539912?accountid=161862. (Year: 2010).*

U.S. Appl. No. 14/025,893, "Customer Controlled Management of Shipments", Unpublished (filed Sep. 13, 2013), (Robert J. Gillen, Inventor) (United Parcel Service of America, Inc., assignee).

U.S. Appl. No. 14/049,605, "Customer Controlled Management of Shipments", Unpublished (filed Oct. 9, 2013), (Carrie Parris, Inventor) (United Parcel Service of America, Inc., assignee).

U.S. Appl. No. 14/049,828, "Customer Controlled Management of Shipments", Unpublished (filed Oct. 9, 2013), (Carrie Parris, Inventor) (United Parcel Service of America, Inc., assignee).

U.S. Appl. No. 14/182,066, "Systems, Methods, and Computer Program Products for Enabling Outcome-Based Service Cycle Management", Unpublished (filed Feb. 17, 2014), (Carrie Parris, Inventor) (United Parcel Service of America, Inc., assignee).

U.S. Appl. No. 14/182,092, "Systems, Methods, and Computer Program Products for Providing Intelligent Visibility Across an Outcome-Based Service Cycle Infrastructure", Unpublished (filed Feb. 17, 2014), (Carrie Parris, Inventor) (United Parcel Service of America, Inc., assignee).

U.S. Appl. No. 14/220,454, "Concepts for Repair, Service, Purchase, Sale or Trade-in of Items", Unpublished (filed Mar. 20, 2014), (Carrie Parris, Inventor) (United Parcel Service of America, Inc., assignee).

U.S. Appl. No. 14/220,546, "Concepts for Repair, Service, Purchase, Sale or Trade-in of Items", Unpublished (filed Mar. 20, 2014), (Carrie Parris, Inventor) (United Parcel Service of America, Inc., assignee).

U.S. Appl. No. 14/472,895, "Systems, Methods, and Computer Program Products for Providing Customized Communication Content in Conjunction With Transport of a Plurality of Packages", Unpublished (filed Aug. 29, 2014), (Robert J. Gillen, Inventor) (United Parcel Service of America, Inc., assignee).

U.S. Appl. No. 14/472,922, "Systems, Methods, and Computer Program Products for Providing a Customized Content Exchange Platform Between Two or More Parties", Unpublished (filed Aug. 29, 2014), (Robert J. Gillen, Inventor) (United Parcel Service of America, Inc., assignee).

U.S. Appl. No. 14/477,474, "Concepts for Using Action Identifiers in Messages", Unpublished (filed Sep. 4, 2014), (Robert J. Gillen, Inventor) (United Parcel Service of America, Inc., assignee).

\* cited by examiner

Tracking Number Table

METHODS, APPARATUSES AND COMPUTER PROGRAM PRODUCTS FOR FACILITATING LABEL LESS RETURNS

CROSS-REFERENCE TO RELATED APPLICATIONS

This application claims priority to U.S. Provisional Application No. 61/880,584, filed Sep. 20, 2013, which is hereby incorporated herein in its entirety by reference.

TECHNOLOGICAL FIELD

The present invention generally relates to a package delivery communication system and, more particularly, to an efficient way of facilitating delivery of packages that reduces the burdens on shipping.

BACKGROUND

The shipping industry has for years provided a service to customers allowing them to send packages to destinations all around the world. To enable the shipper to identify, route, and deliver the packages efficiently to their intended destinations, shippers typically rely on printing a shipping label that may be applied to the package before delivery. The shipping label may indicate information such as the name and address of the sender, the name and address of the recipient, the type of delivery service, as well as various other pieces of information related to the delivery of the package. In some instances, the shipper may include one or more special codes, such as bar codes or MaxiCodes, on the package that may be scanned quickly and easily for routing and tracking purposes as the package is being delivered.

Typically, when a customer wants to ship a package such as, for example, a return package to a merchant using the services provided by the shipper, the customer typically visits a facility of the shipper to provide shipping information for the package so that a shipping label can be generated. As a result, the customer may face several inconveniences related to shipping a package, such as searching for a nearby facility where the package may be dropped off, traveling to and from the facility, and waiting in line at the facility to arrange for shipment of the package. In many instances, a customer may not have the time or the means to generate a shipping label for the return package or to travel to a shipping facility in order to have a shipping label generated.

Moreover, generating shipping labels for return packages may consume computing resources such as, for example, bandwidth, processing capacity and minimize speed of computing devices as well as consume memory space of devices of the shipper. In this regard, generating large numbers of shipping labels may slow down a computing system of the shipper.

Thus, there is a need in the art for methods, apparatuses, systems, and computer program products for allowing a customer to conveniently ship a return package without requiring generation of a shipping label for the return package.

BRIEF SUMMARY

In general, embodiments of the present invention provide systems, methods, apparatuses, and computer program products for facilitating label-less returns of items (e.g., packages, parcels, etc.).

The recent increase in use of communication devices (e.g., mobile devices) by consumers to conduct ecommerce (e.g., mobile ecommerce) has driven a need for new types of processes to meet customer requirements. As such, an exemplary embodiment, may provide a mechanism to ship a return item (e.g., a package received by a customer as a result of an ecommerce purchase) using a communication device (e.g., a mobile device and/or other computing device without a customer printing or otherwise obtaining a new shipping label for the return shipment of the item.

By generating label less returns for items (e.g., packages, parcels, etc.), an exemplary embodiment may conserve computing resources such as, for example, bandwidth, processing capacity and increase speed of communication devices as well as conserve memory space of memory devices utilized by a shipping carrier. As such, unlike conventional systems, an exemplary embodiment facilitating label less returns of items may enhance the operation and/or increase the speed of one or more communication devices of a communication system of a shipping carrier and may conserve memory space of memory devices of the shipping carrier.

An exemplary embodiment may provide a mechanism for a consignee (e.g., a customer) to create an authorized return item(s) (e.g., a package, a parcel, etc.) based in part on using the original delivered item(s) (e.g., a package, a parcel, etc.) and shipping label. As such, some example embodiments may utilize the same shipping label for a return shipment of the item(s) to a shipper. In this regard, in some example embodiments, no new shipping label is required, thus enabling usage of label-less returns of items. In some other example embodiments, a new shipping label may be generated for the return of an item(s). However, a consignee (e.g., a customer) may not be required to obtain the new shipping label.

An exemplary embodiment may also provide a mechanism for a shipper (e.g., a retailer, vendor, merchant, etc.) to participate/enroll in an authorized shipping returns program that allows registered consignees (e.g., customers) having a shipping returns account to return items (e.g., packages, parcels, etc.) without creating a new shipping label. In this regard, an exemplary embodiment may enable a shipper, consignee and/or carrier to establish label-less returns preferences for the authorized shipping returns program.

Additionally, an exemplary embodiment may provide a mechanism to track a return item(s) (e.g., package(s)) based in part on utilizing an original item/shipment identifier (e.g., tracking number) and may allow for multiple messages and/or tracking statuses to be associated by a shipper, consignee and/or carrier with the item/shipment identifier (e.g., a tracking number and/or smart code (e.g., MaxiCode).

In one example embodiment, a method for facilitating label less returns of an item(s) is provided. The method may include receiving a unique shipment identifier of the item in response to a communication device of a customer scanning an original shipping label or one or more markings on the item delivered by a carrier to the customer on behalf of a shipper. The method may further include determining whether the customer is registered in a returns program and whether the item qualifies for return to the shipper based in part on analyzing the shipment identifier. The method may further include generating a return authorization number or an indicator for the item and may link the return authorization number or the indicator to the shipment identifier in response to verifying that the customer is registered in the returns program and that the item qualifies for return to the shipper. The method may further include causing return delivery of the item to the shipper by using the original shipping label or the markings used for shipping on the item that was delivered to the customer by the carrier in response to verifying that the return authorization number or the indicator is linked to the shipment identifier.

In another example embodiment, an apparatus for facilitating label-less returns of an item(s) is provided. The apparatus may include a processor and a memory including computer program code. The memory and the computer program code configured to, with the processor, cause the apparatus to receive a unique shipment identifier of the item in response to a communication device of a customer scanning an original shipping label or one or more markings on the item delivered by a carrier to the customer on behalf of a shipper. The memory and computer program code are further configured to, with the processor, cause the apparatus to determine whether the customer is registered in a returns program and whether the item qualifies for return to the shipper based in part on analyzing the shipment identifier. The memory and computer program code are further configured to, with the processor, cause the apparatus to generate a return authorization number or an indicator for the item and may link the return authorization number or the indicator to the shipment identifier in response to verifying that the customer is registered in the returns program and that the item qualifies for return to the shipper. The memory and computer program code are further configured to, with the processor, cause the apparatus to cause return delivery of the item to the shipper by using the original shipping label or the markings used for shipping on the item that was delivered to the customer by the carrier in response to verifying that the return authorization number or the indicator is linked to the shipment identifier.

In another example embodiment, a computer program product for facilitating label-less returns of an item(s) is provided. The computer program product includes at least one computer-readable storage medium having computer-readable program code portions stored therein. The computer-executable program code instructions may include program code instructions configured to facilitate receipt of a unique shipment identifier of the item in response to a communication device of a customer scanning the original shipping label or one or more markings on the item delivered by a carrier to the customer on behalf of a shipper. The program code instructions may also be configured to determine whether the customer is registered in a returns program and whether the item qualifies for return to the shipper based in part on analyzing the shipment identifier. The program code instructions may also be configured to generate a return authorization number or an indicator for the item and may link the return authorization number or the indicator to the shipment identifier in response to verifying that the customer is registered in the returns program and that the item qualifies for return to the shipper. The program code instructions may also be configured to cause return delivery of the item to the shipper by using the original shipping label or the markings on the item that was delivered to the customer by the carrier in response to verifying that the return authorization number or the indicator is linked to the shipment identifier.

BRIEF DESCRIPTION OF THE SEVERAL VIEWS OF THE DRAWINGS

Figure 1:
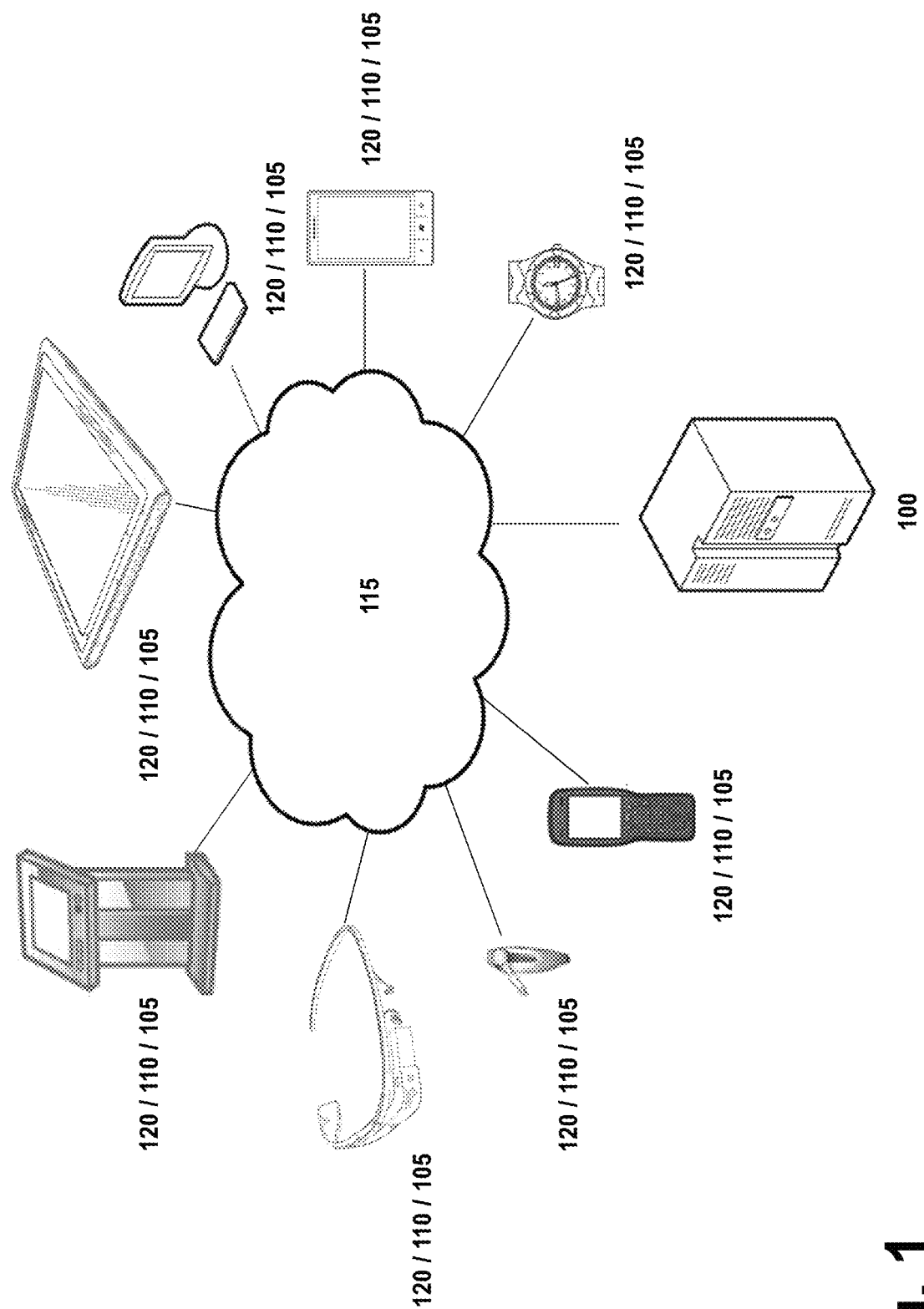

Having thus described the invention in general terms, reference will now be made to the accompanying drawings, which are not necessarily drawn to scale, and wherein:

FIG. 1 is an overview of a system that can be used to practice embodiments of the present invention.

Figure 2:
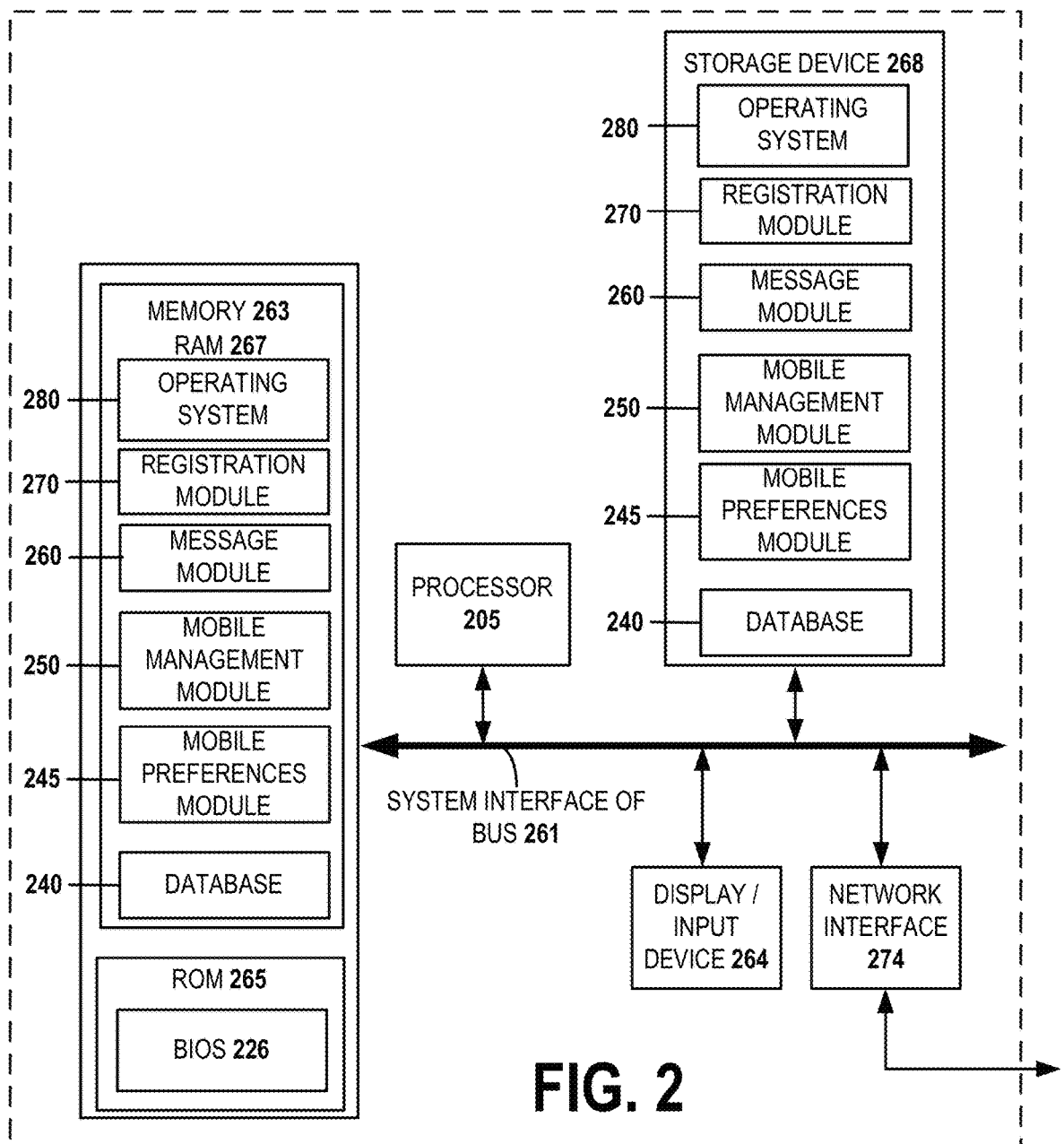

FIG. 2 is an exemplary schematic diagram of a carrier system according to one embodiment of the present invention.

Figure 3:
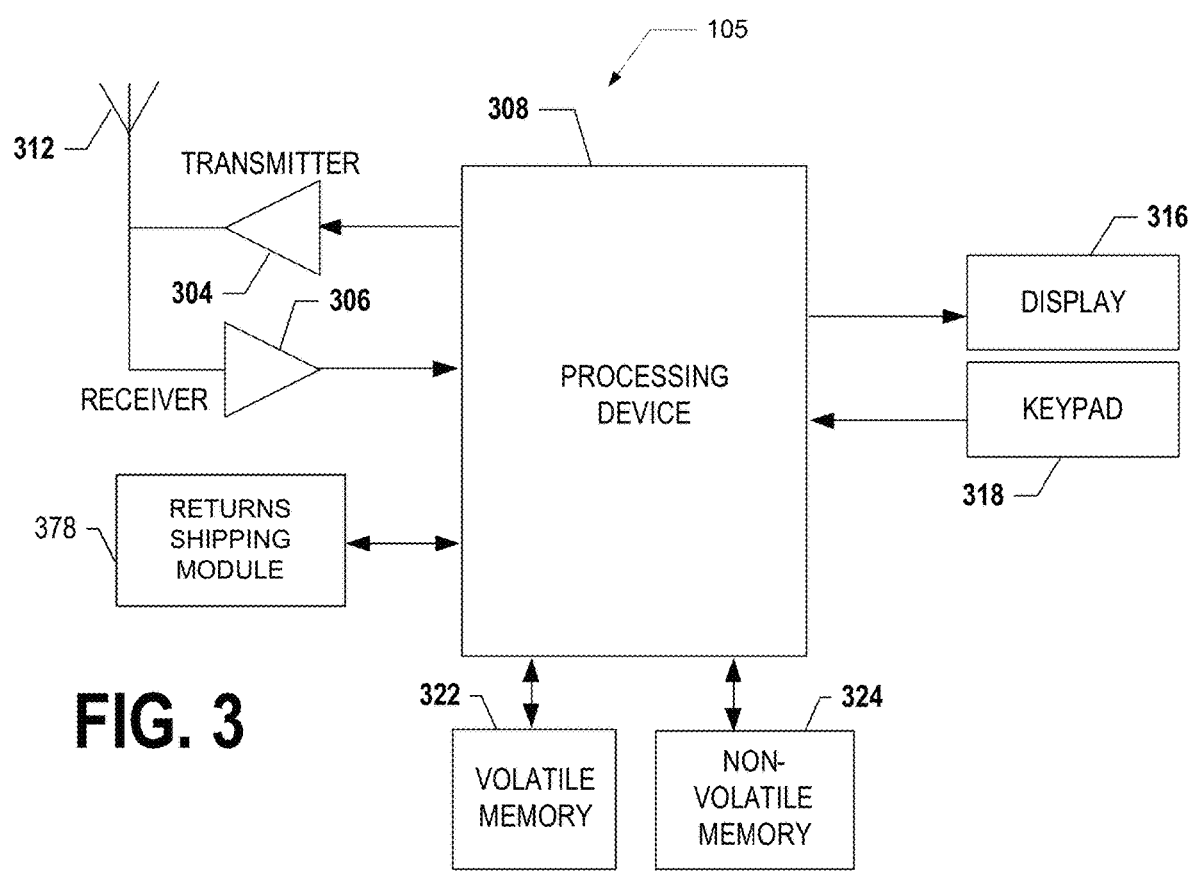

FIG. 3 is an exemplary schematic diagram of a mobile station according to one embodiment of the present invention.

FIG. 4 illustrates an exemplary user registration interface according to one example embodiment of the present invention.

FIG. 5 illustrates an exemplary registered user interface according to one example embodiment of the present invention.

Figure 6:
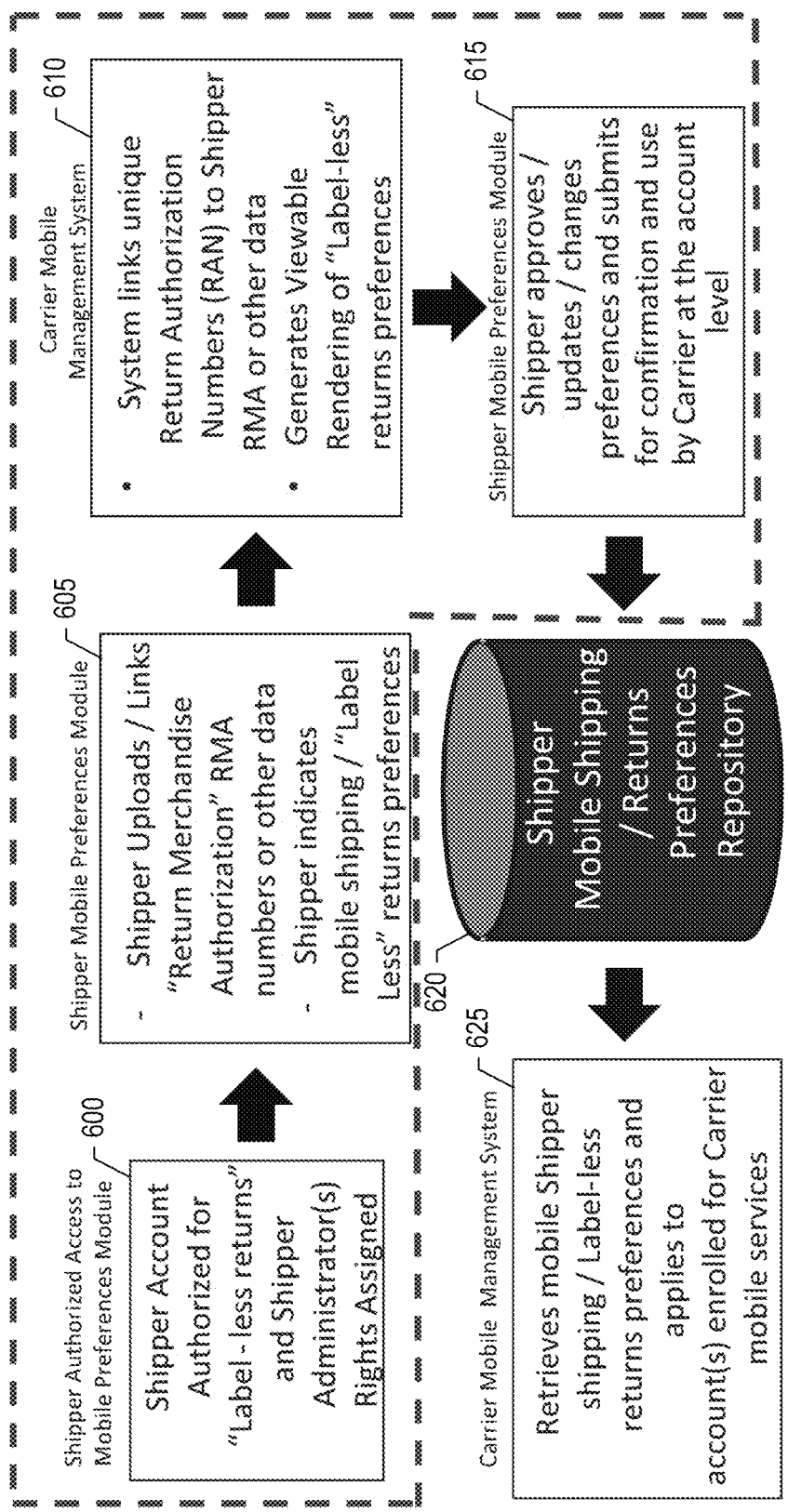

FIG. 6 illustrates an exemplary process flow according to one example embodiment of the present invention.

Figure 7:

FIG. 7 illustrates a tracking number table according to one example embodiment of the present invention.

Figure 8B:
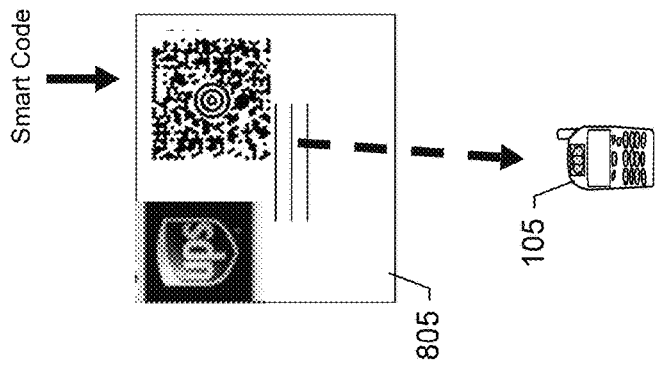
Figure 8A:
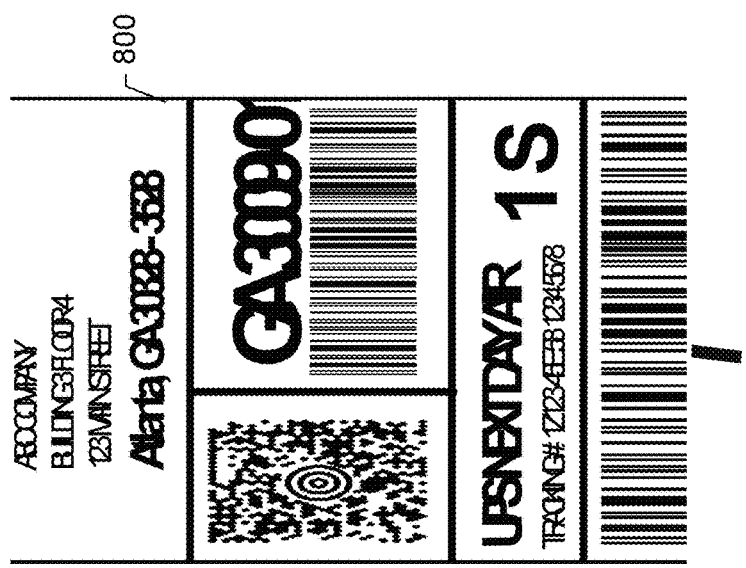
Figure 8A:
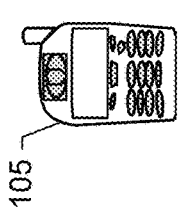

FIGS. 8A and 8B are diagrams of computing devices scanning item/shipment identifiers from an item according to an example embodiment of the present invention.

Figure 9:
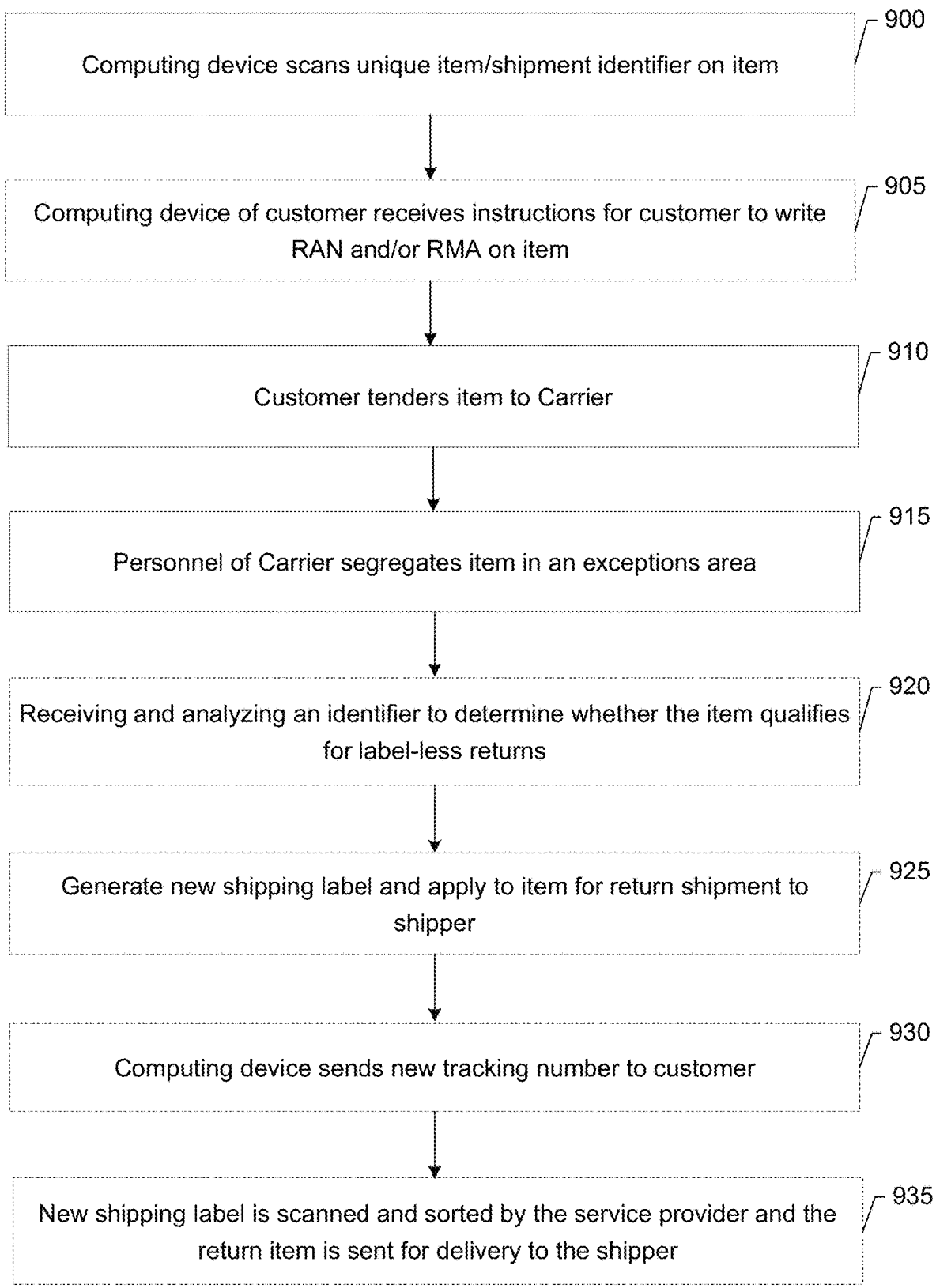

FIG. 9 is a flowchart illustrating exemplary operations and processes according to an exemplary embodiment.

Figure 10:
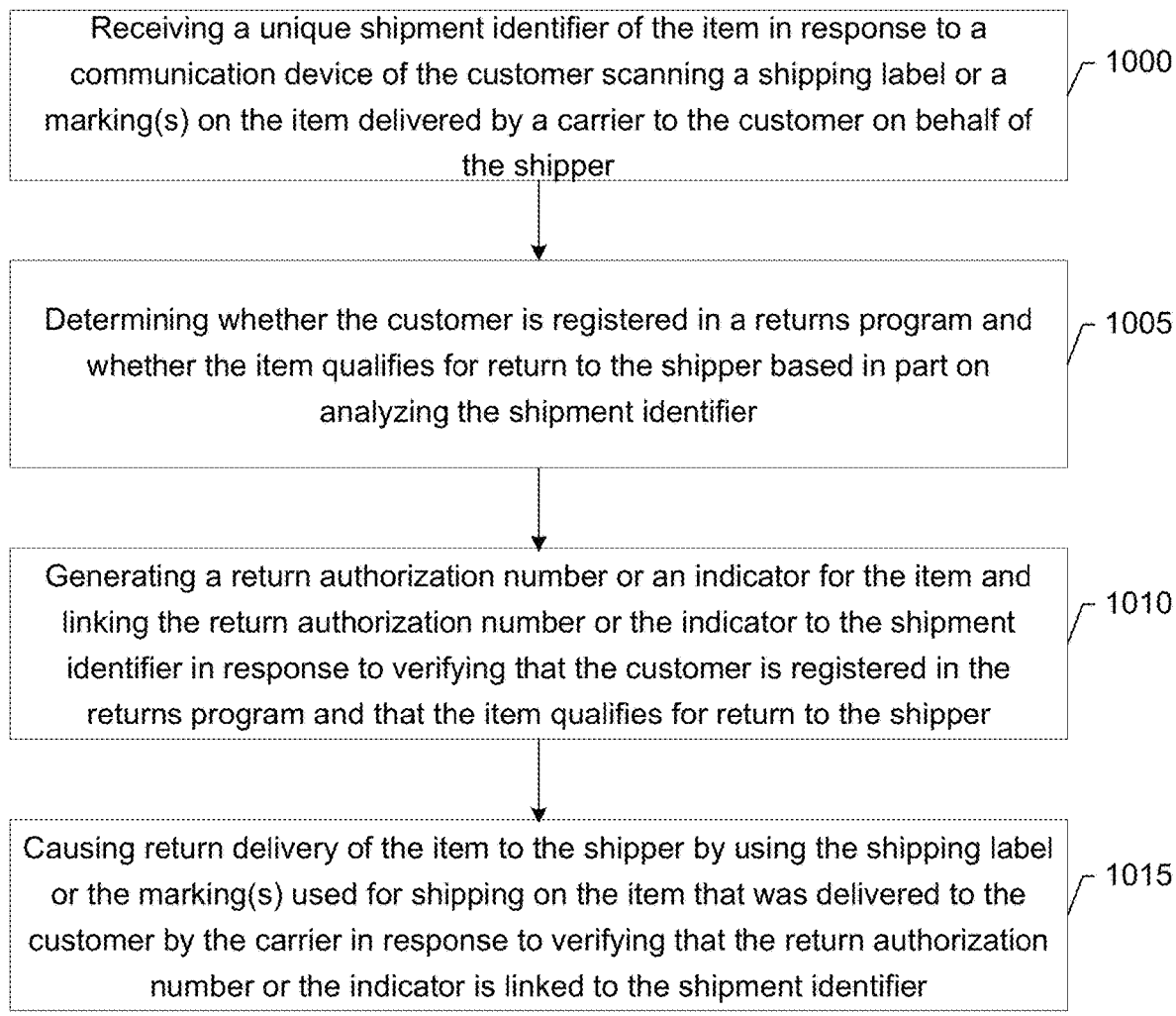

FIG. 10 is a flowchart illustrating exemplary operations and processes for facilitating label-less returns according to an exemplary embodiment of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

Additionally, as referred to herein, a carrier may be a traditional carrier such as, for example, UPS, FedEx, DHL, courier services, the postal services (e.g. United States Postal Service (USPS), Canadian Post), freight companies (e.g. truck-load, less-than-truckload, rail carriers, air carriers, ocean carriers) and/or the like. However, a carrier may also be a nontraditional carrier, such as Amazon, Google, Uber, ride-sharing services, crowd-sourcing services, retailers, and/or the like.

I. METHODS, APPARATUS, SYSTEMS, AND COMPUTER PROGRAM PRODUCTS

As should be appreciated, various embodiments may be implemented in various ways, including as methods, apparatuses, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY SYSTEM ARCHITECTURE

FIG. 1 provides an illustration of a system that can be used in conjunction with various embodiments of the present invention. As shown in FIG. 1, the system may include one or more carrier systems 100, one or more mobile stations 105, one or more consignee computing devices 110, and one or more networks 115, and one or more consignor computing devices 120. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain communication system entities as separate, standalone entities, the various embodiments are not limited to this particular architecture.

1. Exemplary Carrier System

FIG. 2 provides an exemplary schematic of a carrier system 100 according to one embodiment of the present invention. In general, the term "system" may refer to, for example, one or more computers, computing entities, computing devices, mobile phones, gaming consoles (e.g., Xbox, Play Station, Wii), desktops, tablets, notebooks, laptops, distributed systems, servers or server networks, blades, gateways, switches, processing devices, processing entities, set-top boxes, relays, routers, network access points, base stations, the like, and/or any combination of devices or entities adapted to perform the functions, operations, and/or processes described herein. However, the carrier system 100 may also comprise various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components. The carrier system 100 may also be in communication with various payment networks/systems for carrying out or facilitating the payment of fees. As will be recognized, the payment of such fees may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like.

As will be understood from FIG. 1, in one embodiment, the carrier system 100 includes one or more processors 205 that communicate with other elements within the carrier system 100 via a system interface or bus 261. The processor 205 may be embodied in a number of different ways. For example, the processor 205 may be embodied as a processing element, processing circuitry, a coprocessor, a controller or various other processing devices including integrated circuits such as, for example, an application specific integrated circuit (ASIC), a field programmable gate array (FPGA), a hardware accelerator, or the like.

In an exemplary embodiment, the processor 205 may be configured to execute instructions stored in memory or otherwise accessible to the processor 205. As such, whether configured by hardware or software methods, or by a combination thereof, the processor 205 may represent an entity capable of performing operations according to embodiments of the present invention when configured accordingly. A display device/input device 264 for receiving and displaying data may also be included in the carrier system 100. This display device/input device 264 may be, for example, a keyboard or pointing device that is used in combination with a monitor. The carrier system 100 may further include transitory and non-transitory memory 263, which may include both random access memory (RAM) 267 and read only memory (ROM) 265. The carrier system's ROM 265 may be used to store a basic input/output system (BIOS) 226 containing the basic routines that help to transfer information to the different elements within the carrier system 100.

In addition, in one embodiment, the carrier system 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 268 may be connected to the system bus 261 by an appropriate interface.

Furthermore, a number of executable instructions, applications, program modules, and/or the like may be stored by the various storage devices 268 and/or within RAM 267. Such executable instructions, applications, program modules, and/or the like may include an operating system 280, a registration module 270, a message module 260 (also referred to herein as alert module 260), a mobile management module 250, a mobile preferences module 245 (also referred to herein as mobile preferences tool 245) and/or the like. As discussed in more detail below, these executable instructions, applications, program modules, and/or the like may control certain aspects of the operation of the carrier system 100 with the assistance of the processor 205 and operating system 280—although their functionality need not be modularized. In addition to the program modules, the carrier system 100 may store or be in communication with one or more databases, such as database 240.

Also located within the carrier system 100, in one embodiment, is a network interface 274 for interfacing with various computing entities (e.g., with one or more mobile stations 105). For example, the carrier system 100 may be able to receive data and/or messages from and transmit data and/or messages to the mobile station 105, consignee computing devices 110, and consignor computing devices 120. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier system 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, near field communication (NFC) protocols, wireless universal serial bus (USB) protocols, and/or any other wireless protocol.

It will be appreciated that one or more of the carrier system's 100 components may be located remotely from other carrier system 100 components. Furthermore, one or more of the components may be combined and additional components performing functions described herein may be included in the carrier system 100.

2. Exemplary Mobile Station

FIG. 3 provides an illustrative schematic representative of a mobile station 105 that can be used in conjunction with the embodiments of the present invention. Mobile stations 105 can be operated by various parties, including carrier personnel (e.g., delivery drivers, sorters, and/or the like). As shown in FIG. 3, the mobile station 105 can include an antenna 312, a transmitter 304 (e.g., radio), a receiver 306 (e.g., radio), and a processing device 308 (e.g., a processor, controller, and/or the like) that provides signals to and receives signals from the transmitter 304 and receiver 306, respectively.

The signals provided to and received from the transmitter 304 and the receiver 306, respectively, may include signaling information in accordance with an air interface standard of applicable wireless systems. In this regard, the mobile station 105 may be capable of operating with one or more air interface standards, communication protocols, modulation types, and access types. More particularly, the mobile station 105 may operate in accordance with any of a number of wireless communication standards and protocols, such as those described above with regard to the carrier system 100. In a particular embodiment, the mobile station 105 may operate in accordance with multiple wireless communication standards and protocols (e.g., using a Gobi radio), such as such as 802.11, GPRS, UMTS, CDMA2000, 1×RTT, WCDMA, TD-SCDMA, LTE, E-UTRAN, EVDO, HSPA, HSDPA, Wi-Fi, WiMAX, UWB, IR, RFID, Bluetooth™ NFC, wireless USB protocols, and/or any other wireless protocol and/or multiple wireless carriers. To do so, the mobile station 105 may include integrated mobile reception diversity and integrated power management. Such a configuration can provide for global connectivity to the user.

Via these communication standards and protocols, the mobile station 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile station 105 can also download changes, add-ons, and updates, for instance, to its firmware, software (e.g., including executable instructions, applications, program modules), and operating system.

According to one embodiment, the mobile station 105 may include location determining aspects, devices, modules, functionalities, and/or similar words used herein interchangeably. For example, the mobile station 105 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the mobile station's 105 position in connection with a variety of other systems, including wireless towers, Wi-Fi access points, and/or the like. Similarly, the mobile station 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, wireless towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile station 105 may also comprise a user interface (that can include a display 316 coupled to a processing device 308) and/or a user input interface (coupled to the processing device 308). The user input interface can comprise any of a number of devices allowing the mobile station 105 to receive data, such as a keypad 318, a touch display, voice or motion interfaces, or other input device. In embodiments including a keypad 318, the keypad 318 can include the conventional numeric (0-9) and related keys (#, *), and other keys used for operating the mobile station 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile station 105 may also include a returns shipping module 378. In an exemplary embodiment, the processing element 305 may be in communication with and may otherwise control the returns shipping module 378. The returns shipping module 378 may be any means such as a device or circuitry operating in accordance with software or otherwise embodied in hardware or a combination of hardware and software thereby configuring the device or circuitry (e.g., a processor, controller, microprocessor or the like) to perform the corresponding functions of the returns shipping module 378, as described below. In one example embodiment, the returns shipping module 378 may, but need not, be employed in a special purpose chip such as, for example, an application-specific integrated (ASIC) or a field-programmable gate array (FPGA). In examples in which software is employed, a device or circuitry (e.g., processing element 305 in one example) executing the software (e.g., an application) forms the structure associated with such means. As such, for example, the returns shipping module 378 may be configured to, among other things, scan a shipment identifier (e.g., a tracking number) on an item (e.g., a package, a parcel, etc.) to initiate return of the item to a shipper (e.g., a retailer, a vendor, a merchant or the like) without obtaining a new shipping label for the return of the item, as described more fully below.

The mobile station 105 can also include transitory and not-transitory memory such as, for example, volatile memory 322 and/or non-volatile memory 324, which can be embedded and/or may be removable. For example, the non-volatile memory may be embedded or removable MMCs, secure digital SD memory cards, Memory Sticks, EEPROM, flash memory, hard disk, or the like. The memory can store any of a number of pieces or amount of information and data used by the mobile station 105 to implement the functions of the mobile station 105. The memory can also store content, such as computer program code for an application and/or other computer programs.

In some example embodiments, a user (e.g., a user or user representative operating a mobile station 105) may be requested to provide payment information/data. In this regard, the mobile station 105 may facilitate payments (e.g., the payment information/data) in a variety of forms, such as via debit cards, credit cards, direct credits, direct debits, cash, check, money order, Internet banking, e-commerce payment networks/systems (e.g., PayPal, Google Wallet, Amazon Payments), virtual currencies (e.g., Bitcoins), award or reward points, and/or the like. Such payments may be made using a variety of techniques and approaches, including through NFC technologies such as PayPass, Android Beam, S Beam, BLE, and various other contactless payment systems. Further, such payment technologies may include PayPal Beacon, Booker, Erply, Leaf, Leapset, Micros, PayPal Here, Revel, ShopKeep, TouchBistro, Vend, and/or the like.

3. Exemplary Consignee Computing Device

The consignee computing devices 110 may each include one or more components that are functionally similar to those of the carrier system 100 and/or mobile station 105. For example, in one embodiment, each of the consignee computing devices may include: (1) a processor that communicates with other elements via a system interface or bus; (2) a user interface; (3) transitory and non-transitory memory; and (4) a communications interface. As noted, the consignee computing device 110 may comprise a user interface (that can include a display device/input device coupled to a processing element 308) and/or a user input interface (coupled to a processing element 308). For example, the user interface may be a carrier application, browser, user interface, dashboard, webpage, and/or similar words used herein interchangeably executing on and/or accessible via the consignee computing device 110 to interact with and/or cause display of information from the carrier system 100, as described herein. These architectures are provided for exemplary purposes only and are not limiting to the various embodiments. In general, the terms device, system, computing entity, entity, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. A customer may refer to either a consignor (e.g., a party shipping an item via carrier) or a consignee (e.g., a party receiving an item from a carrier). In the returns context, a consignee who received an item can become a consignor when returning an item.

4. Exemplary Consignor Computing Device

The consignor computing devices 120 may each include one or more components that are functionally similar to those of the carrier system 100, mobile station 105, and/or consignee computing device 110. For example, in one embodiment, each of the consignor computing devices may include: (1) a processor that communicates with other elements via a system interface or bus; (2) a user interface; (3) transitory and non-transitory memory; and (4) a communications interface. As noted, the consignor computing device 120 may comprise a user interface (that can include a display device/input device coupled to a processing element 308) and/or a user input interface (coupled to a processing element 308). For example, the user interface may be a carrier application, browser, user interface, dashboard, webpage, and/or similar words used herein interchangeably executing on and/or accessible via the consignor computing device 120 to interact with and/or cause display of information from the carrier system 100, as described herein.

These architectures are provided for exemplary purposes only and are not limiting to the various embodiments. A customer may refer to a consignor (e.g., a party shipping an item via a carrier), a consignee (e.g., a party receiving an item from a carrier) a third party, and/or the like. In the returns context, a consignor who shipped an item can become a consignee when an item is being returned.

III. EXEMPLARY SYSTEM OPERATION

Reference will now be made to FIGS. 4-7, 8A-8B and 9-10 associated with mechanisms and techniques for facilitating label-less returns of items according to some exemplary embodiments. In this regard, an exemplary embodiment may enable a consignee(s) (e.g., a customer) to create an authorized return item (e.g., a package, a parcel, etc.) based in part on utilizing an original delivered item (e.g., a package, a parcel, etc.) and shipping label. As such, some example embodiments may utilize the same shipping label on the original delivered item for the return shipment of the item. In this manner, in some example embodiments, no new shipping label may be required thus enabling label-less returns of items. In some other example embodiments, a new shipping label may be generated for the return of an item. However, a consignee (e.g., a customer) may not be required to obtain the new shipping label.

Additionally, some example embodiments may facilitate an initial/original delivery of an item (e.g., a package, parcel, etc.) to a customer without a shipper being required to apply a shipping label to the item. Such techniques are described more fully in U.S. Pat. No. 8,010,463, which is herein incorporated by reference in its entirety.

Furthermore, in some example embodiments, a computing device may capture an indication of a smart code (e.g., MaxiCode) associated with an item (e.g., a package, a parcel, etc.) and may transmit shipping information and data associated with the item (e.g., package) to a carrier to be stored in association with each other in order to ship an original item without requiring generation of a shipping label. Such techniques are described more fully in U.S. Patent Publication No. 2013/0284800, which is herein incorporated by reference in its entirety.

1. Registration

In one example embodiment, a process for enrolling/registering of one or more customers (e.g., consignors and/or consignees) for a customer pickup, delivery, and/or returns program may be provided. In one example embodiment, the returns program may be a label-less returns program that does not require a customer(s) to apply a shipping label on an item (e.g., a package, a parcel, etc.) for return of the item to a shipper (e.g., a retailer, an ecommerce retailer (also referred to herein as e-retailer), etc.). A customer (e.g., consignor, consignee, third party, and/or the like) may be an individual, a family, a company, an organization, an entity, a department within an organization, a representative of an organization and/or person, and/or the like. To register, a customer (e.g., a customer or customer representative operating a consignee computing device 110 or consignor computing device 120) may access a webpage, application, dashboard, browser, or portal of a carrier, such as, for example, United Parcel Service of America, Inc. (UPS). For instance, as shown in FIGS. 5 and 6, the carrier system 100 may transmit a webpage that provides the customer with an option of logging into a customer account or enrolling/registering for a customer pickup, delivery, and/or returns program (e.g., label-less returns program).

In one embodiment, as part of the enrollment/registration process, the customer (e.g., operating a consignee computing device 110 or consignor computing device 120) may be requested to provide biographic and/or geographic information by the carrier system 100 (e.g., via the registration module 270). Such information may be manually input or provided by allowing access to other accounts, such as Facebook, Gmail, Twitter, PayPal, and/or the like. For instance, the customer may provide the customer's name, such as a first name, a last name, a company name, an entity name, and/or an organization name. The customer (e.g., consignor or consignee) may also provide any aliases associated with the customer.

The customer (e.g., consignor or consignee) may also provide one or more physical addresses associated with the customer (e.g., street address, city, state, postal code, and/or country) as well as one or more secondary residential addresses to the carrier system 100 for association with the customer's account and profile. Such techniques are further described in U.S. patent application Ser. No. 14/025,893, which is hereby incorporated in its entirety by reference.

In one embodiment, once the carrier system 100 receives the necessary biographic and/or geographic information from the customer, the carrier system 100 may perform one or more validation operations. For example, the carrier system 100 may determine whether the primary address (and/or other addresses) in the specified country or postal code is eligible for a customer pickup, delivery, and/or returns programs. The carrier system 100 may also determine whether the primary address (and/or other addresses) is valid, e.g., by passing the primary address through one or more address cleansing or standardization systems. The carrier system 100 may perform a variety of fraud prevention measures as well, such as determining whether the customer (e.g., consignor or consignee) or one of the customer's addresses has been "blacklisted" from customer pickup, delivery, and/or returns programs. As will be recognized, a variety of other approaches and techniques can be used to adapt to various needs and circumstances.

In one embodiment, the carrier system 100 may create a customer profile for the customer via the enrollment/registration process. Accordingly, the carrier system 100 may create and store various customer profiles (e.g., via database 240). In addition to at least the information described above, a customer profile may include one or more corresponding usernames and passwords. As will be recognized, each of the physical addresses may be associated with the customer's profile. In some example embodiments, the carrier system 100 may determine whether a customer(s) registered to participate in a returns program such as, for example, a label-less returns program based in part on analyzing data of a customer profile(s) indicating the customer(s) signed up for the returns program (e.g., label-less returns program) upon successfully verifying the username and password of the customer(s). Alternatively, a customer(s) may enter (e.g., into the login of a webpage or portal) identifying information as a "guest" without establishing an account. Additional concepts for enrollment/registration of one or more customers for a customer pickup, delivery, and/or returns program are described in U.S. patent application Ser. No. 14/025,893, which is hereby incorporated in its entirety by reference.

The carrier system 100 may also be in communication with various payment networks/systems for carrying out or facilitating the payment of fees. In some example embodiments, participation by customers in the customer pickup, delivery, and/or returns program may be free. However, in some other example embodiments, participation, by customers, in the customer pickup, delivery, and/or returns program may require a fee (e.g., a premium customer pickup, delivery, and/or returns program). Payments for such fees may be in a variety of forms, such as, for example, via debit card, credit card, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like.

2. Customer and Item Matching

In one embodiment, once a customer (e.g., consignor or consignee) profile has been created by the carrier system 100, one or more items to be picked up from, delivered to, and/or returned to/from the customer can be identified as corresponding to the customer. By identifying items corresponding to the customer, the carrier system 100 can provide the customer with access to various features of the customer pickup, delivery, and/or returns program (e.g., a label-less returns program). As will be recognized, an item may be one or more packages, parcels, bags, containers, loads, crates, items banded together, vehicle parts, pallets, drums, the like, and/or similar words used herein interchangeably. Such items may be capable of connecting to other items and/or computing entities and may include the ability to communicate (e.g., via a chip (e.g., an integrated circuit chip), RFID, NFC, Bluetooth, Wi-Fi, and any other suitable communication techniques) with one another and/or communicate with various computing entities for a variety of purposes. In this regard, in some example embodiments, an item(s) may communicate send "to" address information, received "from" address information, a unique identifier code(s) and any other suitable information. In one embodiment, each item may include an item/shipment identifier, such as an alphanumeric identifier. Such item/shipment identifiers (as well as physical and virtual addresses) may be represented as text, barcodes, Aztec Codes, MaxiCodes, Data Matrices, Quick Response (QR) Codes, electronic representations, and/or the like. The unique item/shipment identifier (e.g., 123456789) may be used by the carrier to identify and track the item as it moves through the carrier's transportation network. Further, such item/shipment identifiers can be affixed to items by, for example, using a sticker (e.g., label) with the unique item/shipment identifier printed thereon (in human and/or machine readable form), an RFID tag with the unique item/shipment identifier stored therein or a Near Field Communication (NFC) tag with the unique item/shipment identifier stored therein.

Additionally, in some example embodiments, upon detecting a smart code, such as, for example, a MaxiCode, associated with an item (e.g., a package, a parcel) to be returned, input information related to shipment of the item may be transmitted with the smart code to the carrier system 100. Thereafter, the customer need only leave the item at any carrier, or non-carrier, drop off location or schedule pick-up of the item by a carrier. A representative of the carrier may then collect the item, capture the smart code associated with the item using a handheld device (e.g., e.g., mobile station 105), which may transmit the smart code to the carrier system 100, and receive in response shipping information associated with the smart code. Once the shipping information is received, the carrier representative may generate and print a shipping label to be attached to the item. The item is then ready to be shipped without requiring further information from the customer or from the item. Such techniques are described more fully in U.S. Patent Publication No. 2013/0284800, which is incorporated herein in its entirety by reference.

In one embodiment, the carrier system 100 may store an item/shipment identifier in association with shipping data for the item. The shipping data may include information about the item, such as delivery service level. For example, the delivery service level may be Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like. The shipping data may include information about the party shipping the item (e.g., consignor), such as the party's address, the party's phone number, the party's return address, the party's name, and/or the like. The shipping data may also include information about the customer to whom the item is to be delivered (e.g., consignee), such as the customer's physical address or location (e.g., delivery point/location), the customer's virtual address, the customer's phone number, the customer's name, and/or the like. As will be recognized, the terms delivery point/location are intended to encompass any identifiable location, including residences, commercial locations, stores, vehicles, boats, landmarks, and/or the like.

In one embodiment, the shipping data may include information about the item itself and any tracking information. The tracking information may reflect the item's movement in the carrier's transportation network, including an expected pickup or delivery date and time. To reflect the item's movement, an item/shipment identifier associated with the item may be scanned or otherwise electronically read at various points as the item is transported through the carrier's transportation network. For example, the item/shipment identifier (e.g., 123456789) may be automatically scanned by a barcode or MaxiCode device, an RFID interrogator, by a camera controller, or by a carrier employee using a handheld device (e.g., mobile station 105). In one embodiment, each time the item/shipment identifier is scanned or read, an appropriate device can transmit the item/shipment identifier and other appropriate information (e.g., location and time of the scan or reading) to the carrier system 100. The carrier system 100 can then receive and use the information to track the item as it is transported though the carrier's transportation network and update the shipping data accordingly.

In addition to providing item/shipment identifier information (e.g., tracking information) regarding an item, the interface (e.g., browser, dashboard, application) may provide a hyperlink associated with the particular item that is associated with the audio, image and/or video file uploaded with the shipment data. Additional information regarding such hyperlinks associated with a particular item that is associated with the audio, image and/or video file uploaded with the shipment data are described in U.S. patent application Ser. Nos. 14/472,895 and 14/472,922, which are both hereby incorporated in their entireties by reference. For example, the linked audio/visual message may be a personal message from the shipper (e.g., Happy Birthday), an advertisement, information about the item being shipped (e.g., assembly instructions, feature description) and/or return instructions. In other embodiments, the message may be a link to the shipper's website or a message posted on a third-party website (e.g., YouTube). These links may be customized according to the items being shipped.

3. Messages/Alerts

In one embodiment, customers (e.g., operating customer computing devices) can customize and/or provide communication preferences regarding items to be picked up from or delivered to the customers as well as for items to be returned from a customer to a shipper (e.g., a retailer. For example, the communication preferences may provide customers with the ability to request messages for items before a carrier attempts to pick up or deliver items (e.g., prior to the first delivery attempt by the carrier) and/or after items have been picked up or delivered.

In one embodiment, a customer (e.g., operating a consignee computing device 110 or consignor computing device 120) can identify one or more communication formats for communicating with the customer. The communication formats may include text messages (e.g., Short Message Service (SMS) and/or Multimedia Messaging Service (MMS), email messages, audio messages (e.g., voice messages), video message (e.g., YouTube, the Vine), picture message (e.g., Instagram), social media message (e.g., private social media created internally for entities, business social media (e.g., Yammer, SocialCast), or public social media (e.g., Facebook, Instagram, Twitter)), and/or a variety of other messages in various communication formats. In addition to identifying one or more communication formats, the customer (e.g., operating a customer computing device 110/120) can identify the corresponding electronic destination addresses to be used in providing information regarding items to be picked up from or delivered to the customer. In this regard, for text messages, the customer may provide one or more cellular phone numbers. For email messages, the customer may provide one or more email addresses. And for voice messages, the customer may provide one or more cellular or landline phone numbers. Such communication preferences are described more fully in U.S. application Ser. No. 14/025,893, which is incorporated herein in its entirety by reference.

In one embodiment, the carrier system 100 can automatically generate (e.g., via the message module 260) one or more messages providing information regarding an item to be delivered to the customer in compliance with the customer's communication preferences and the carrier's time constraints. Similarly, the carrier system 100 can automatically transmit the one or messages to the electronic destination addresses in compliance with the customer's communication preferences and the carrier's time constraints.

4. Shipper Returns Preferences

In one example embodiment, one or more shippers (e.g., one or more entities (e.g., a retailer, a ecommerce retailer (e-retailer), a vendor, a merchant, etc.) which sales goods and/or services to a customer(s) and/or arranges for shipment of items to the customer(s)) may register with a carrier (e.g., UPS) via the carrier system 100 to enroll and participate in a returns program (e.g., a label-less returns program). In this regard, upon successful enrollment, the carrier system 100 may set up a returns program account on behalf of registered shippers. Alternatively, in some example embodiments, a shipper(s) that is not enrolled in the returns program may still be able to access/utilize the returns program upon entering or providing (e.g., into the login of a webpage or portal) identifying information to the carrier, as a "guest" (e.g., a guest shipper, or a non-registered shipper) without registering for enrollment in the returns program. In some example embodiments, a guest shipper may be able to register for participation in the returns program during the returns process. As such, a shipper(s) may utilize the mobile preferences module 245 to input and provide shipping (e.g., mobile shipping) and returns preferences (e.g., service level preferences, cost preferences, pickup preferences, returns information (e.g., Return Merchandise Authorization (RMA) information), provision and/or acceptance of image messages, video messages, audio messages, text messages, advertisements, etc.) to the carrier system 100 which associates the preferences with the returns program account of the shipper and stores the preferences in a returns preferences repository of a memory (e.g., database 240), as described more fully below.

Referring now to FIG. 6, an exemplary method for establishing shipper returns preferences is provided according to an example embodiment. At operation 600, upon receipt of registration information (e.g., a registered username and password associated with a valid returns program account) provided via a computing device (e.g., consignor computing device 120) to the mobile management module 250 of a carrier system (e.g., carrier system 100), the mobile management module 250 may determine that a returns program account of a shipper(s) is authorized for label-less returns and the mobile management module 250 may assign one or more shipper administrator(s) rights to the returns program account of the shipper. In response to the account of a shipper(s) being authorized for label-less returns (e.g., via the mobile management module 250), the shipper(s) may be enabled to utilize a mobile preferences module (e.g., mobile preferences module 245) of a computing device (e.g., consignor computing device 120).

At operation 605, a shipper(s) may upload/link or provide (e.g., via the mobile preferences module 245) one or more RMA numbers or other data (e.g., one or more return merchandise generic codes) for items that may qualify and which may be designated for return to the shipper to the mobile management module 250 of the carrier system 100. The mobile preferences module 245 may also provide an indication, to the mobile management module 250, of the shipper(s) specifying one or more mobile shipping/label-less returns preferences. The label-less returns preferences may include but are not limited to: an indication denoting whether the shipper(s) pays for return of an item(s) on behalf of a customer(s); an indication designating whether the shipper(s) accepts returns of an item(s) but designating that the customer(s) pay for the return of the item(s); an indication designating whether the shipper(s) may send an image message, video message, audio message, advertisement message, or text message to a customer(s) regarding a return of an item(s); an indication designating whether the shipper(s) may accept/receive an image message, video message, audio message, or text message from a customer(s) regarding a return of an item(s); an indication denoting that specified items do not qualify for return (e.g., the shipper(s) is not accepting returns for a particular item(s)) from a customer(s); service level preferences for returns of items (e.g., Next Day Air, Overnight, etc.), cost preferences for returns of an item(s); and any other suitable data.

At operation 610, the mobile management module 250 of carrier system 100 may generate and link unique return authorization numbers (RANs), on behalf of a carrier (e.g., UPS), to the RMAs designed by the shipper(s). In addition, the mobile management module 250 may generate viewable renderings of the label-less returns preferences specified by the shipper(s). At operation 615, the mobile preferences module 245 of consignor computing device 120 may specify an indication of approval by the shipper(s) of the returns preferences, or an update/change(s) of the returns preferences and may submit the approval or update/change(s) regarding the returns preferences for confirmation and use by a carrier (e.g., UPS) at an account level (e.g., associated with the returns program account of the shipper(s)).

At operation 620, the mobile management module 250 of carrier system 100 may store the confirmed returns preferences in a mobile shipping/returns preferences repository of a memory (e.g., database 240). At operation 625, the mobile preferences module 245 of consignor computing device 120 may retrieve (e.g., from the mobile shipping/returns repository) one or more of the mobile shipping/label-less returns preferences and may apply the returns preferences to one or customer accounts enrolled for mobile shipping services (e.g., customers enrolled in the label-less returns program).

5. Exemplary Tracking Number Table

Referring now to FIG. 7, an exemplary embodiment of a tracking number table (TNT) is provided. The tracking number table 700 may be stored in a memory (e.g., database 240). The tracking number table 700 may be generated by the mobile management module 250 of a carrier system 100. The tracking number table 700 may include information indicating the data associated with a unique item/shipment identifier (e.g., a tracking number) and/or a smart code (e.g., MaxiCode, etc.) and information indicating one or more messages that may be provided by a shipper(s) (e.g., a retailer (e.g., an e-retailer), a vendor, etc.) to a customer(s) for one or more items associated with a unique item/shipment identifier(s). The tracking number table 700 may also include information indicating one or more messages that may be provided by a customer(s) to a shipper(s) for one or more items associated with a unique item/shipment identifier(s). The tracking number table 700 may also indicate the status (e.g., delivery status (e.g., in-transit, out-for-delivery, delivered)) of one or more items (e.g., packages, parcels, etc.) associated with a corresponding item/shipment identifier. In some example embodiments, a carrier may manage the carrier system 100 and may control or approve the information (e.g., preferences information) designated for a tracking number table (e.g., tracking number table 700) prior to inclusion of the information in the tracking number table. In this regard, the carrier may have certain preferences that are particular to the carrier and/or a service provider that are specified for inclusion in the tracking number table.

In an instance in which the mobile management module 250 determines that an item(s) associated with an item/shipment identifier (e.g., a tracking number, smart code) qualifies for label-less returns, the mobile management module 250 may specify in the column of the tracking number table 700 designed as label-less returns indicator, that the item(s) qualifies for label-less returns. The mobile management module 250 may determine that an item(s) qualifies for label-less returns based in part on analyzing returns preferences data of a shipper for the goods (e.g., shoes, electronics, etc.) of the item(s) (e.g., a package, a parcel, etc.). For instance, the returns preferences data provided to the mobile management module 250 by the shipper (e.g., via a mobile preferences module 245) may specify that the goods qualify for label-less returns.

In the tracking number table 700, the mobile management module 250 determines that an item(s) associated with an item/shipment identifier (e.g., smart code (e.g., MaxiCode)) which has a status "out-for-delivery" qualifies for label-less returns as designated by an indication of "Yes", but that the customer must pay for the return of the item(s) to the shipper (e.g., a retailer (e.g., a Shoe Company)). In an example embodiment, the mobile management module 250 may determine that a customer must pay for the return of an item(s) in an instance in which only a designation indicating "Yes" is provided in the label-less returns indicator column of the tracking number table 700.

As another example, in the tracking number table 700, the mobile management module 250 determines that an item(s) associated with an item/shipment identifier (e.g., smart code (e.g., MaxiCode)) which has a status "delivered" qualifies for label-less returns as designated by an indication of "Yes—eRetailer sponsored", and that the shipper pays for the return of the item(s) to the shipper (e.g., a retailer (e.g., a Shoe Company, etc.)) on behalf of the customer. In one example embodiment, the mobile management module 250 may determine that a shipper pays for the return of the item(s) to the shipper on behalf of a customer in an instance in which a designation indicating (e.g., "eRetailer sponsored") that the shipper sponsors the return of the item(s) is provided in the label-less returns indicator column of the tracking number table 700.

In the example embodiment of the tracking number table 700, in an instance in which there is no designation indicated in the label-less returns indicator associated with a corresponding item/shipment identifier, the mobile management module 250 may determine that a corresponding item(s) (e.g., an item associated with tracking number 1234567878) does not qualify for the label-less returns program.

Furthermore, the sending "to" consignee message indicator of the tracking number table 700 may denote that a shipper may send a message (e.g., an image message, a video message, an audio message, a text message, an advertisement, an Emoji message and/or other symbols for a message, etc.) to a customer that received an item(s) delivered by a carrier on behalf of the shipper. In this regard, the mobile preferences module 245 may send a message to a communication device (e.g., mobile station 105) of the customer. For example, in the example embodiment of the tracking number table 700, the sending "to" consignee message indicator indicates that the shipper may send an audio message to a communication device (e.g., mobile station 105) of a customer for goods (e.g., shoes, electronics, etc.) of an item(s) that qualifies for label-less returns which are eRetailer sponsored. For purposes of illustration and not of limitation, the audio message may be a voice message to the customer indicating a manner in which to care for the goods (e.g., shoes, electronics, etc.).

Additionally, for purposes of illustration and not of limitation, an example of an advertisement message indicated in the sending "to" consignee message indicator may be a message on a label of an item (e.g., package, parcel, etc.) indicating a sale price on the purchase of additional goods of the same type and/or email message sent to the customer in which the email indicates the advertisement message of the sale price. For purposes of illustration and not of limitation, an example of a video message indicated in the sending "to" consignee message indicator may be a video indicating proper usage of the goods of an item (e.g., package, parcel, etc.). Moreover, for purposes of illustration and not of limitation, an example of a text message indicated in the sending "to" consignee message indicator may be text describing that an item (e.g., a package, a parcel) is currently in route for delivery to a customer.

Moreover, the sending "from" consignee message indicator of the tracking number table 700 may include designations by the mobile management module 250 indicating one or more messages (e.g., an image message, an audio message, a video message, a text message, an advertising message, an Emoji message and/or other symbols for a message, etc.) from a customer to a shipper. In this regard, for purposes of illustration and not of limitation, the indication of the "Yes—Audio" message in the sending "from" consignee message indicator may relate to a voice message sent to a computing device of a shipper in which the customer is complaining about the quality of goods (e.g., shoes, electronics, etc.) of an item (e.g., a package, a parcel, etc.) being returned to the shipper.

Additionally, the tracking number table 700 may specify data indicating one more messages that a driver, service provider, service company, and/or transportation carrier (e.g., UPS) may send a customer(s), shipper(s), consignee(s) and/or third parties regarding an item (e.g., a package (e.g., a returns package)) associated with an item/shipment identifier (e.g., a tracking number, smart code). For instance, for purposes of illustration and not of limitation in an example embodiment, a mobile management module 250 may analyze an item/shipment identifier (e.g., a tracking number, smart code) and on the basis of the item/shipment identifier may determine that a driver, service provider, service company, and/or transportation carrier is authorized to send a customer a message associated with the delivery or pickup of the item(s) associated with the item/shipment identifier (e.g., smart code (e.g., MaxiCode)). As such, the mobile management module 250 may indicate information in the tracking number table 700 specifying that the driver and/or personnel of the service provider, service company, and/or transportation carrier may utilize a handheld device (e.g., mobile station 105 (e.g., a DIAD)) to send a customer(s) an audio message (e.g., "Package hidden behind plant") for an item(s) (e.g., a package containing shoes), associated with the item/shipment identifier (e.g., smart code), that qualifies for label-less returns. As shown in the tracking number table 700, this item(s) delivered by the driver qualifies for label-less returns as denoted by the designation "Yes" in the column of the label-less returns indicator.

As another example, the mobile management module 250 may include information in the tracking number table 700 specifying that a driver may send (e.g., via a handheld device (e.g., mobile station 105 (e.g., a DIAD))) a message (e.g., an image and text message (e.g., "Picture—Package left at garage door")) to a customer for an item associated with another item/shipment identifier (e.g., a smart code). For more information on custom messages associated with an item (e.g., a package, a parcel), see U.S. patent application Ser. Nos. 14/472,895 and 14/472,922, which both are incorporated herein in their entirety by reference.

In an example embodiment, in an instance in which the mobile management module 250 receives an indication of a scan of an item/shipment identifier (e.g., tracking number, smart code, etc.) from a computing device (e.g., mobile station 105) of a customer, the mobile management module 250 may analyze the data of the tracking number table 700 and may determine whether an item(s) qualifies for label-less returns, as described more fully below.

6. Exemplary Embodiment of Facilitating Label-Less Returns

Referring now to FIG. 9, a flowchart illustrating exemplary operations and processes for facilitating label-less returns is provided according to an exemplary embodiment. In this regard, consider an example in which a customer (e.g., a consignee) registers for participation in a returns program such as, for example, a label-less returns program in which a customer may initiate return of an item (e.g., a package, a parcel, etc.) to a shipper (e.g., a retailer, a vendor, a merchant, etc.) without the customer obtaining a new label on the item. Consider further that the customer desires to return an item(s) (e.g., a package, a parcel, etc.) delivered by a carrier on behalf of a shipper (e.g., a retailer (e.g., e-retailer), vendor, merchant etc.) from which the customer purchased services or goods (e.g., shoes, electronic products, etc.) of the item(s). In this regard, as shown in FIG. 8A and FIG. 8B, in an instance in which the customer utilizes a returns shipping module (e.g., returns shipping module 378) of a computing device (e.g., mobile station 105) to scan a unique item/shipment identifier (e.g., a tracking number, smart code (e.g., MaxiCode), etc.) (e.g., Block 900 of FIG. 9) of an item (e.g., package 800 of FIG. 8A, package 805 of FIG. 8B) delivered by a carrier on behalf of a shipper (e.g., a retailer, vendor, merchant, etc.), the returns shipping module may provide the item/shipment identifier to a mobile management module 250 of a carrier system 100.

In this regard, the mobile management module 250 may analyze the item/shipment identifier in a tracking number table (e.g., tracking number table 700) to determine whether the item qualifies for label-less returns to a shipper. For example, in an instance in which the mobile management module 250 detects an indication in a label-less returns indicator of the tracking number table 700, associated with the item/shipment identifier, indicating that the item qualifies for label-less returns, the mobile management module 250 may, but need not, generate a unique return authorization number (RAN), an indicator (e.g., a designated number(s), a designated symbol(s), etc.) and/or a return authorization generic code(s) and may link the RAN, the indicator and/or the return authorization generic code(s) to a corresponding RMA and/or a return merchandise generic code(s) provided to the mobile management module 250 by a shipper (e.g., via a consignor computing device 120). In an example embodiment, the RAN may be a unique number generated on behalf of a carrier for the return of an item(s) by a customer to a shipper (e.g., a retailer, vendor, merchant or the like). In some example embodiments, the mobile management module 250 may not generate a RAN(s) and instead may utilize an RMA(s) to facilitate a label-less return of an item(s). In some other example embodiments in which a shipper may not utilize/generate RMAs for returns, the mobile management module 250 may generate one or more RANs associated with one or more corresponding item/shipment identifiers for goods that the shipper specifies in received returns preferences qualify for label-less returns.

In some alternative example embodiments, a label(s) (e.g., a shipping label) on the original item(s) received by a customer, via a carrier, on behalf of a shipper may have an item/shipment identifier with a suffix at the end of the item/shipment identifier, or a scratch-off sticker/label at the end of the item/shipment identifier which when scratched off denotes that the item(s) qualifies for label-less returns to the shipper. In still other alternative example embodiments, the label(s) on the original item(s) received by a customer on behalf of the shipper may be double-sided and in response to peeling off (e.g., personnel of a carrier peeling off) one side of the double-sided label, the other side of the double-sided label may denote that the item(s) qualifies for label-less returns and may include the address in which the item(s) is to be returned to the shipper.

On the other hand, in an instance in which the mobile management module 250 determines that the item(s) does not qualify for label-less returns in response to detecting that the label-less returns indicator of the tracking number table 700 does not indicate the item(s) qualifies for label-less returns, the mobile management module 250 may send a message to a computing device (e.g., mobile station 105, consignee computing device 110) of the customer indicating that(s) the item(s) does not qualify for label less returns. In this regard, in an instance in which the customer may take the item(s) to a store of a carrier, or another authorized outlet of the carrier, or a driver of the carrier for return of the item(s) to the shipper, the store, the authorized outlet, or the driver may not accept the item(s) for return to the shipper.

In some example embodiments, subsequent to generating the RAN and/or identifying the RMA in an instance in which the item(s) qualifies for label-less returns, the mobile management module 250 may send a message with the generated RAN and/or the corresponding RMA to a computing device (e.g., mobile station 105, consignee computing device 110) of the customer. In some example embodiments, the message may, but need not, also include instructions to write the RAN and/or RMA on the item(s) (e.g., Optional Block 905 of FIG. 9). In this regard, the customer may write the RAN and/or the RMA on the item (e.g., on an original shipping label of a package that was initially delivered to the customer on behalf of the shipper). In some other example embodiments, in an instance in which the mobile management module 250 determines that the item(s) qualifies for label-less returns, the customer may not be sent a message instructing the customer to write a RAN and/or RMA on the item(s) since the mobile management module 250 may associate a generated RAN, an indicator, a return authorization generic code(s), a RMA and/or a return merchandise generic code(s) with an item/shipment identifier (e.g., a tracking number or smart code). In this regard, the mobile management module 250 may store the association of a RAN, an indicator, a return authorization generic code(s), a RMA and/or a corresponding return merchandise generic code(s) with the item/shipment identifier in a memory (e.g., in a tracking number table of a database (e.g., database 240)). As such, in this example embodiment, the customer is not required to write a RAN and/or a RMA on the item(s).

The customer may then provide the item(s) to the carrier (e.g., UPS) that initially delivered the item(s) to the customer on behalf of the shipper, without applying a new label to the item(s) (e.g., Block 910 of FIG. 9). In an example embodiment, the customer may provide the item(s) to the carrier by providing the item(s) to a store of the carrier, a drop-box of the carrier, a customer counter of the carrier, a driver of the carrier or any other authorized shipping outlet of the carrier. Upon receipt of the item(s) from the customer by the carrier, a service provider (e.g., package operations personnel (e.g., a sorter)) of the carrier may segregate the item(s) and place the item(s) in an exception area (e.g., Block 915 of FIG. 9). In response to receiving an identifier (e.g., a shipping identifier (e.g., a RAN, a RMA, an item/shipment identifier)), the mobile management module 250 may confirm that the item(s) qualifies for label-less returns (e.g., Optional Block 920 of FIG. 9). For instance, in response to receiving an indication of the RAN and/or the RMA input to a computing device (e.g., mobile station 105 (e.g., a DIAD)) by the service provider and provided to the management mobile module 250, the management mobile module 250 may confirm that the item(s) qualifies for label-less returns. In example embodiments in which the RAN and/or RMA may not be written on the item(s), the service provider may utilize a computing device (e.g., mobile station 105 (e.g., a DIAD)) to scan the item/shipment identifier and based on analyzing the item/shipment identifier, the mobile management module 250 may detect an associated RAN and/or RMA and may confirm that the item(s) qualifies for label-less returns. Additionally, some example embodiments may or may not include the carrier applying a standard label shipping label.

For example, in some example embodiments a shipping label may not be included on an item delivered by a carrier on behalf of a shipper. In this regard, the item for return shipment to the shipper may have other information such as, for example, identifying information (also referred to herein as non-label information) including, but not limited to, a marking(s), a symbol(s), symbology, a number(s), a Twitter handle(s), etc. that may be utilized for delivery of the item to the customer and which may be utilized for return of the item from the customer to the shipper. For instance, the non-label information may be linked to the sender address (e.g., shipper address) and delivery address (e.g., customer address) and as such in an instance in which the non-label information is detected (e.g., via a scan from a mobile station of the customer of a DIAD of personnel of the carrier) and received by the carrier system 100, the mobile management module 250 of the carrier system 100 may determine the shipper address in which the item is to be returned. For more information on using identifiers to facilitate shipping of items see e.g., U.S. patent application Ser. No. 14/477,474, which is incorporated herein in its entirety by reference.

Furthermore, in example embodiments in which an item(s) may include a suffix at the end of item/shipment identifier, or a scratch off sticker/label at the end of the item/shipment identifier or a double-sided label, the service provider may analyze the suffix, the indicated information as a result of scratching off the sticker/label or the information obtained from a peeled off side of the double-sided label to determine that the item(s) qualifies for label-less returns.

In some example embodiments, in response to the mobile management module 250 indicating confirmation that the item(s) qualifies for label-less returns, a service provider of the carrier may, but need not, apply a new shipping label to the item(s) for return delivery to the shipper (e.g., retailer, vendor, merchant, etc.) from which the customer originally purchased goods of the item(s) (e.g., Optional Block 925 of FIG. 9). The new shipping label may include a new item/shipment identifier (e.g., tracking number) assigned by the mobile management module 250. In this regard, the mobile management module 250 may send the new tracking number to a computing device (e.g., mobile station 105, consignee computing device 110) of the customer to enable the customer track the status of physical delivery of the return of the item to the shipper (e.g., Optional Block 930 of FIG. 9). The new shipping label is then scanned (e.g., via a mobile station 105 (e.g., a DIAD)) and sorted by the service provider and the return item is sent for delivery to the shipper (e.g., Optional Block 935 of FIG. 9).

In an alternative example embodiment, the item(s) to be returned to the shipper may include a pre-printed label and/or an item/shipment identifier label (e.g., a tracking number label) that may be integrated with the item(s), for example, in a parcel (e.g., an envelope). As such, a service provider (e.g., package operations personnel) of the carrier may remove and attach the pre-printed label and/or the item/shipment identifier label (e.g., a tracking number label) over the original shipping label of the item(s) for return delivery to the shipper.

In some other example embodiments, in response to the mobile management module 250 indicating confirmation that the item(s) qualifies for label-less returns, a service provider (e.g., package operations personnel) of the carrier may or may not apply a new shipping label to the item(s) for return delivery to the shipper (e.g., retailer, vendor, merchant, etc.). In this regard, the service provider of the carrier may arrange for physical delivery of the item(s) to the shipper in response to utilizing a computing device (e.g., mobile station 105 (e.g., a DIAD)) to scan the original label (e.g., scanning smart code (e.g., MaxiCode) on the original shipping label) on the item(s) and being provided the "From" address of the item(s) (e.g., the address of the shipper). In this example embodiment, the item/shipment identifier (e.g., tracking number) on the original shipping label may be utilized by the customer to track the return of the item(s) to the shipper.

In an instance in which the sending "from" consignee message indicator of a tracking in number table (e.g., tracking number table 700) indicates that the customer may send the shipper a message (e.g., an image message, a video message, a text message, an advertising message, an Emoji message and/or other symbols for a message, etc.), the customer may utilize a computing device (e.g., mobile station 105, consignee computing device 110) to send a message to a computing device (e.g., consignor computing device 120) of the shipper associated with the return (e.g., a label-less return) of the item(s) to the shipper. For purposes of illustration and not of limitation, the message may be, for example, an audio message recorded by the customer indicating that the quality of the goods of the item(s) from the shipper is poor or of low quality. As described above, one or more messages (e.g., an image message, a video message, a text message, etc.) other than audio messages may be sent by a customer to a shipper based in part on designations indicated in the sending "from" consignee message indicator of a transition number table (e.g., tracking number table 700).

Referring now to FIG. 10, an exemplary method of facilitating label-less returns is provided according to an example embodiment. At operation 1000, an apparatus (e.g., carrier system 100) may receive a unique shipment identifier (e.g., a tracking number, a smart code (e.g., MaxiCode)) of an item (e.g., a package, a parcel, etc.) in response to a communication device (e.g., mobile station 105, consignee computing device 110) of a customer scanning a shipping label (e.g., an original shipping label) or one or more markings (e.g., a symbol(s), symbology, a number(s), a Twitter handle(s), etc.) on the item delivered by a carrier (e.g., UPS) to the customer on behalf of a shipper (e.g., a retailer, vendor, merchant, etc.).

At operation 1005, an apparatus (e.g., carrier system 100) may determine whether the customer is registered in a returns program (e.g., a label-less returns program) and whether the item qualifies for return to the shipper based in part on analyzing the shipment identifier (e.g., a tracking number, a smart code (e.g., MaxiCode)). At operation 1010, an apparatus (e.g., carrier system 100) may generate a return authorization number or an indicator (e.g., a designated number(s), a designated symbol(s), a designated code(s), etc.) for the item and may link the return authorization number or the indicator to the shipment identifier (e.g., a tracking number, a smart code (e.g., MaxiCode)) in response to verifying that the customer is registered in the returns program and that the item qualifies for return to the shipper.

At operation 1015, an apparatus (e.g., carrier system 100) may cause return delivery of the item to the shipper by using the shipping label and/or the markings on the item that was delivered (e.g., via transportation, carrier, etc. by a delivery company) to the customer by the carrier in response to verifying that the return authorization number or the indicator is linked to the unique shipment identifier. For instance, the mobile management module 250 of the carrier system 100 may verify the return authorization number or the indicator for return of the item is linked to the unique shipment identifier in response to personnel of the carrier using a computing device (e.g., mobile station 105 (e.g., a DIAD)) to scan the shipment identifier once the customer provides the item to the carrier for return. The carrier system may then arrange, manage and thereafter execute the return delivery of the physical item to the shipper and/or designated third party. Additional concepts for return delivery techniques are further described in U.S. patent application Ser. Nos. 14/049,828, 14/182,066, 14/049,605, 14/182,092, 14/220,546 and 14/220,454, each of which are incorporated herein in their entirety by reference.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for returning an item to a shipper that eliminates a need of a customer to apply a shipping label to an item, the method comprising:

receiving a unique shipment identifier in response to a communication device scanning a machine readable indicia of an original shipping label of a shipped item, wherein the original shipping label comprises a scratch-off portion;

accessing and analyzing shipper data and customer data linked to the unique shipment identifier, wherein the customer data comprises a registration status for a returns program and wherein the shipper data comprises a return location and a return qualification status for the shipped item;

based on at least the registration status and the return qualification status, generating a return authorization number for the shipped item, associated with the machine readable indicia revealed by scratching off the scratch-off portion of the original label;

linking the generated return authorization number to the unique shipment identifier, such that scanning the machine readable indicia revealed by scratching off the scratch-off portion of the original shipping label accesses the return authorization number;

tracking the return delivery by:
  detecting a location of the shipped item in response to the communication device scanning the machine readable indicia revealed by scratching off the scratch-off portion of the original shipping label, wherein the machine readable indicia revealed by scratching off the scratch-off portion of the original shipping label is linked to the generated return authorization number; and
  generating updates stored to a tracking number table, wherein the updates comprise the locations of the shipped item scanned by the communication device; and causing return delivery of the shipped item to the return location in accordance with the accessed return authorization number linked to the machine readable indicia revealed by scratching off the scratch-off portion of the original label.

2. The method of claim 1, wherein:

the return qualification status further comprises one or more returns preferences received from the shipper indicating that the item is designated for return to the return location.

3. The method of claim 1, wherein the scratch-off portion of the original shipping label is located in the same location as the machine readable indicia of the original shipping label.

4. The method of claim 1, wherein the scratch-off portion of the original shipping label is adjacent to the machine readable indicia of the original shipping label.

5. The method of claim 2, wherein:
analyzing further comprises analyzing the returns preferences received from the shipper in a returns reference repository.

6. The method of claim 1, wherein:
causing the return delivery further comprises analyzing the unique shipment identifier of the shipped item in the tracking number table; and
verifying that the accessed return authorization number is linked to the return authorization number.

7. The method of claim 1, wherein the shipper data further comprises:
a registration in a shipper's returns program that allows the shippers to establish one or more returns preferences designating whether one or more goods or services qualify for return.

8. The method of claim 7, wherein the shipper data further comprises:
an indication that the customer is allowed to send the shipper one or more messages regarding the return delivery of the item based in part on analyzing at least one of the returns preferences designating that the customer is allowed to send the messages to the shipper.

9. The method of claim 8, wherein the shipper data further comprises:
an indication that the shipper is allowed to send the customer one or more other messages regarding the shipped item based in part on analyzing at least one of the returns preferences designating that the shipper is allowed to send the one or more messages to the customer.

10. The method of claim 9, wherein the shipper data further comprises:
an indication that a carrier is allowed to send the customer, the shipper, a consignee or a third party one or more additional messages regarding the shipped item.

11. The method of claim 10, wherein:
the one or more messages, the one or more other messages or the one or more additional messages comprise at least one of an image message, a picture message, a video message, an audio message, an advertisement message, or an Emoji message.

12. An apparatus comprising at least one processor and at least one memory including computer program code, the at least one memory and the computer program code configured to, with the processor, cause the apparatus to at least:
receive a unique shipment identifier associated with a shipped item in response to a communication device scanning a smart code associated with an original label applied to the shipped item delivered by a carrier to the customer on behalf of the shipper, wherein the original label comprises a reversible, double-sided label, wherein the reversible, double-sided label is configured to be peeled off the shipped item and reapplied to the shipped item such that a smart code on the reverse side of the reversible double-sided label is exposed;
access and analyze shipper data and customer data linked to the unique shipment identifier wherein the customer data comprises a registration status for a returns program and wherein the shipper data comprises a return location and a return qualification status for the shipped item;
generate a return authorization number for the shipped item at least based on the registration status and the return qualification status, wherein the return authorization number is associated with the smart code on the reverse side of the original shipping label;
link the return authorization number to the unique shipment identifier such that scanning the smart code on the reverse side of the original shipping label on the shipped item accesses the return authorization number;
track the return delivery by:
detecting a location of the shipped item in response to the communication device scanning the smart code on the reverse side of the original shipping label, wherein the smart code on the reverse side of the original shipping label is linked to the generated return authorization number; and
generating updates stored to a tracking number table, wherein the updates comprise the locations of the shipped item scanned by the communication device; and
cause return delivery of the shipped item to the return location in accordance with the accessed return authorization number linked to the smart code on the reverse side of the original shipping label.

13. The apparatus of claim 12, wherein the memory and computer program code are further configured to, with the processor, cause the apparatus to:
verify that the shipped item qualifies for return to the return location based in part on analyzing one or more returns preferences received from the shipper indicating that the shipped item is designated for return to the return location.

14. The apparatus of claim 12, wherein:
the reversible, double-sided portion of the label comprises the area of the smart code associated with the original label.

15. The apparatus of claim 12, wherein the double-sided label portion of the label comprises the area of the original shipping label.

16. The apparatus of claim 13, wherein the memory and computer program code are further configured to, with the processor, cause the apparatus to:
perform the analyzing by analyzing the returns preferences received from the shipper in a returns reference repository.

17. The apparatus of claim 12, wherein the memory and computer program code are further configured to, with the processor, cause the apparatus to:
further cause the return delivery by analyzing the unique shipment identifier of the item in a tracking number table.

18. The apparatus of claim 12, wherein prior to the generating the return authorization number, the memory and computer program code are further configured to, with the processor, cause the apparatus to:
determine whether the shipper is registered in a returns program for shippers which allows the shippers to establish one or more returns preferences designating whether one or more goods or services qualify for return.

19. The apparatus of claim 18, wherein the memory and computer program code are further configured to, with the processor, cause the apparatus to:

determine that the customer is allowed to send the shipper one or more messages regarding the return delivery of the item based in part on analyzing at least one of the returns preferences designating that the customer is allowed to send the messages to the shipper.

20. The apparatus of claim 19, wherein the memory and computer program code are further configured to, with the processor, cause the apparatus to:

determine that the shipper is allowed to send the customer one or more other messages regarding the shipped item based in part on analyzing at least one of the returns preferences designating that the shipper is allowed to send the messages to the customer.

21. The apparatus of claim 20, wherein the memory and computer program code are further configured to, with the processor, cause the apparatus to:

determine that the carrier is allowed to send the customer, the shipper, a consignee or a third party one or more additional messages regarding the item delivered by the carrier to the customer.

22. The apparatus of claim 21, wherein:

the one or more messages, the one or more other messages or the one or more additional messages comprise at least one of an image message, a picture message, a video message, an audio message, an advertisement message, an Emoji message.

23. A computer program product comprising at least one non-transitory computer-readable storage medium of a network device, the storage medium having computer-readable program code portions stored therein, the computer-readable program code portions comprising:

program code instructions configured to facilitate receipt of a unique shipment identifier associated with an item in response to a communication device scanning a smart code of an original shipping label, wherein the original shipping label comprises a scratch-off portion;

program code instructions configured to access and analyze shipper data and customer data linked to the unique shipment identifier wherein the customer data comprises a registration status for a returns program and wherein the shipper data comprises a return location and a return qualification status for the shipped item;

program code instructions configured to generate a return authorization number for the shipped item at least based on the registration status and the return qualification status and link the return authorization number to the unique shipment identifier such that scanning the smart code revealed by scratching off the scratch-off portion of the original shipping label on the shipped item accesses the return authorization number;

program code instructions configured to track the return delivery by:

detecting a location of the shipped item in response to the communication device scanning the smart code revealed by scratching off the scratch-off portion of the original shipping label, wherein the smart code revealed by scratching off the scratch-off portion of the original shipping label is linked to the generated return authorization number; and generating updates stored to a tracking number table, wherein the updates comprise the locations of the shipped item scanned by the communication device; and program code instructions configured to cause return delivery of the shipped item to the return location in accordance with the accessed authorization number linked to the smart code revealed by scratching off the scratch-off portion of the original shipping label.

24. The computer program product of claim 23, further comprising:

program code instructions configured to verify that the shipped item qualifies for return to the return location based in part on analyzing one or more returns preferences received from the shipper indicating that the shipped item is designated for return to the return location.

25. The computer program product of claim 23, further comprising:

program code instructions configured to analyze a suffix at an end of the unique shipment identifier to determine that the shipped item is designated for return to the return location.

* * * * *